United States Patent [19]

Noonan

[11] Patent Number: 4,776,531
[45] Date of Patent: Oct. 11, 1988

[54] HIGH LIFT, LOW PITCHING MOMENT AIRFOILS

[75] Inventor: Kevin W. Noonan, Newport News, Va.

[73] Assignee: The United States of America as represented by the Administrator of the National Aeronautics and Space Administration, Washington, D.C.

[21] Appl. No.: 904,132

[22] Filed: Sep. 5, 1986

[51] Int. Cl.$^4$ .............................................. B64C 3/14
[52] U.S. Cl. ............................ 244/35 R; 416/223 R
[58] Field of Search ............... 244/34 R, 35 A, 35 R, 244/123; 416/223 R, 242

[56] References Cited

U.S. PATENT DOCUMENTS 4,412,664 11/1983 Noonan ............................ 244/35 R

FOREIGN PATENT DOCUMENTS 0111785 6/1984 European Pat. Off. .
WO85/03051 7/1985 PCT Int'l Appl. .
2138374 10/1984 United Kingdom .

Primary Examiner—Galen Barefoot
Attorney, Agent, or Firm—George F. Helfrich; John R. Manning; Charles E. B. Glenn

[57] ABSTRACT

This invention relates to airfoils which have particular application to rotors of helicopters and rotorcraft and to aircraft propellers. Two airfoil profiles, the RC(4)XX and RC(5)XX are shaped to permit (1) the development of high air loads without causing an extensive separation of the boundary layer air, (2) a distribution of airloads which results in a near zero pitching moment coefficient about the quarter chord for a range of lift coefficients from −0.2 to 1.0 for Mach numbers up to 0.63, and (3) the development of a local supersonic flow field which is so shaped that the wave losses are minimal until higher free stream Mach numbers over a range of lift coefficients from 0.0 to 0.30. Thus, both airfoils have high maximum lift coefficients, low pitching moment coefficients, and high drag divergence Mach numbers to result in improved rotor or propeller performance. The two invention airfoils are related in shape and purpose. The use of either airfoil by itself or the use of one in conjunction with the second would depend upon the design requirements of the particular application.

1 Claim, 12 Drawing Sheets

COMPARISON OF RC(4)-10 AND VR-7

—— 20 RC(4)-10
--- 40 VR-7

FIGURE 7
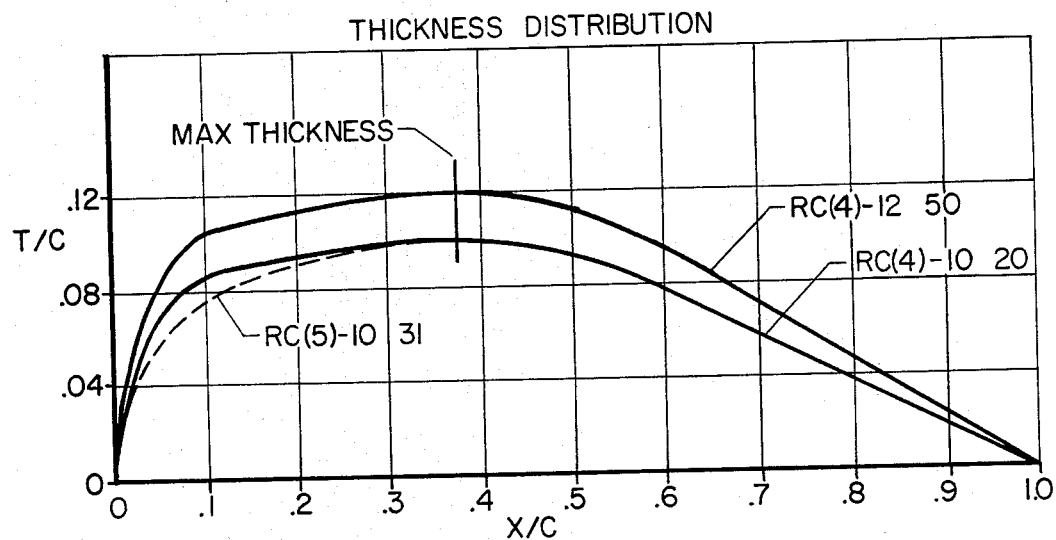
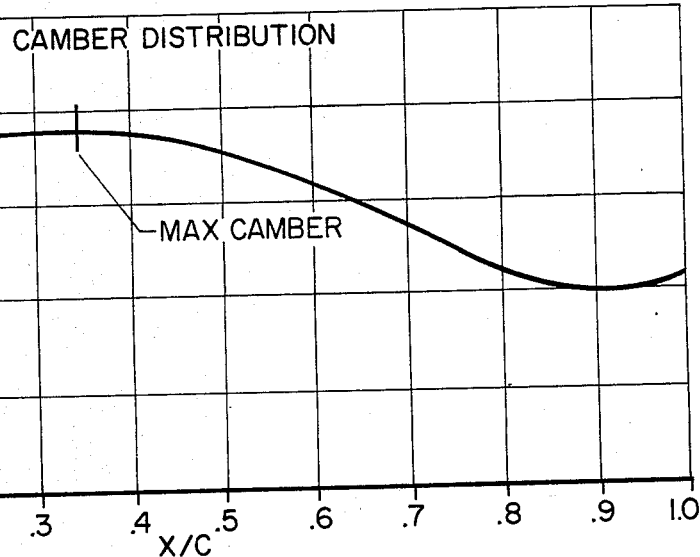
FIGURE 8

HIGH LIFT, LOW PITCHING MOMENT AIRFOILS

ORIGIN OF THE INVENTION

The invention described herein was made by an employee of the United States Government and may be manufactured and used by the Government for governmental purposes without the payment of any royalties thereon or therefor.

TECHNICAL FIELD OF THE INVENTION

This invention relates to rotating airfoils and more particularly to the blades of a rotor type aircraft (e.g., a helicopter) and aircraft propellers.

BACKGROUND OF THE INVENTION

The performance of a helicopter can be limited by aerodynamic and/or dynamic considerations. The maximum gross weight at a given forward flight velocity, the maneuverability at a given forward flight velocity, and the maximum forward flight velocity can all be limited by retreating blade stall. Other aerodynamic considerations such as advancing blade drag divergence and pitching moment could also limit the maximum forward flight velocity.

The airfoil section requirements for a helicopter rotor are more complex than those for a fixed wing aircraft because, on a single revolution of the rotor, an airfoil section can experience lift coefficients from negative values to the maximum positive value and section Mach numbers from subsonic to transonic values. Since the ranges of lift coefficients and Mach numbers experienced by an airfoil section depend on its radial location along the rotor blade and the helicopter flight conditions, different airfoil sections have been used for a specified range of radial positions along the rotor blade.

The maximum lift coefficient of an airfoil section is of considerable importance in the process of selecting airfoils for application to a helicopter rotor. When the maximum lift coefficient of an airfoil section is exceeded (i.e., the airfoil is stalled), the corresponding drag coefficient increases dramatically and the pitching moment coefficient can change direction (nose-up to nose-down) as well as change greatly in magnitude. When a significant part of a rotor blade is operating beyond the maximum lift coefficient of the local airfoil section, the power required to sustain flight exceeds the power available, thus limiting the particular flight condition. As pointed out above, this could occur with increases in aircraft gross weight, in maneuvers, or in forward flight.

Prior art airfoil sections intended for use in the inboard region of a rotor blade or propeller are designed for high maximum lift coefficients and low pitching moment coefficients.

Accordingly, it is an object of this invention to provide an airfoil section which will operate at high lift coefficients before stalling (i.e., have high $c_{l_{max}}$) at Mach numbers from near zero to about 0.50 and which will simultaneously provide both near zero pitching moment coefficients about the quarter chord and low drag coefficients for a broad range of lift coefficients and Mach numbers.

It is a further object of this invention to provide near zero pitching moment coefficients about the quarter chord for lift coefficients from −0.2 to 1.0 for Mach numbers from near zero to 0.63 and to provide pitching moment coefficients less than 0.02 in magnitude for lift coefficients equal to or less than the maximum positive value (unstalled) for Mach numbers from near zero to 0.63.

It is a further object of the invention to provide a drag divergence Mach number in excess of 0.73 for lift coefficients from 0.0 to 0.30.

It is a further object of the invention to provide an airfoil section with a camber line that is used as the basis for a family of airfoils. That is, new airfoils of different maximum thicknesses are developed by a combination of the camber line of the airfoil sections described herein and a thickness distribution that is scaled from any one of those shown herein to provide specific maximum lift coefficients and drag divergence characteristics while retaining the near zero pitching moment coefficients.

It is a further object of the invention to provide improved rotor or propeller performance which results in fuel savings and/or increases in aircraft gross weight, maneuverability, and forward flight speed.

Other objects and advantages of this invention will become apparent hereinafter in the specification and drawing which follow.

SUMMARY OF THE INVENTION

According to the present invention, the foregoing and additional objects are obtained by providing rotor blades or propellers which have an airfoil section or sections of a particular shape. The particular airfoil shapes which result in the desired performance are given by the coordinates listed in Tables I and II and by the following description of the camber line and thickness distributions. Generally, a first family of airfoils, hereinafter referred to as RC(4)-XX (where XX is the maximum airfoil thickness of a particular family member), has an upper surface slope which is positive and decreasing from about the leading edge to the maximum ordinate at about 37 percent chord location. Behind the maximum ordinate, the upper surface slope is negative and decreasing to an inflection point at about 70 percent chord location. Behind this inflection point, the upper surface slope continues to be negative but is increasing to the trailing edge.

The lower surface slope of the RC(4)-XX family is negative and increasing from about the leading edge to about 9 percent chord location, where there is a local minimum. The lower surface slope is then positive and increasing to a local maximum point about 19 percent chord location. The lower surface slope is then negative and decreasing to the minimum ordinate at about 42 percent chord location. Behind the minimum ordinate, the lower surface slope is positive and increasing to the trailing edge.

A second family of airfoils, hereinafter referred to as RC(5)-XX, has a very similar shape to the RC(4)-XX family discussed above. The main distinction is found in the lower surface. The lower surface slope of the RC(5)-XX is negative and increasing from about the leading edge to the minimum ordinate at about 42 percent chord location. Behind the minimum ordinate, the lower surface slope of the RC(5)-XX is positive and increasing to the trailing edge, as is the RC(4)-XX. Another distinction is that the upper surface ordinates of the RC(5)-XX are less positive than those of the RC(4)-XX from about the leading edge to about 22 percent chord location. Behind about 22 percent chord location, the upper surface slope of the RC(5)-XX conforms to that of the RC(4)-XX.

BRIEF DESCRIPTION OF THE DRAWINGS

FIG. 7 is a plot of the thickness distributions for 2 representative members of invention airfoil family RC(4)-XX and 1 representative member of invention airfoil family RC(5)-XX;

FIG. 8 is a plot of the camber line representative of the airfoil families according to the present invention;

DETAILED DESCRIPTION OF THE INVENTION

Figures 1A, 1B:
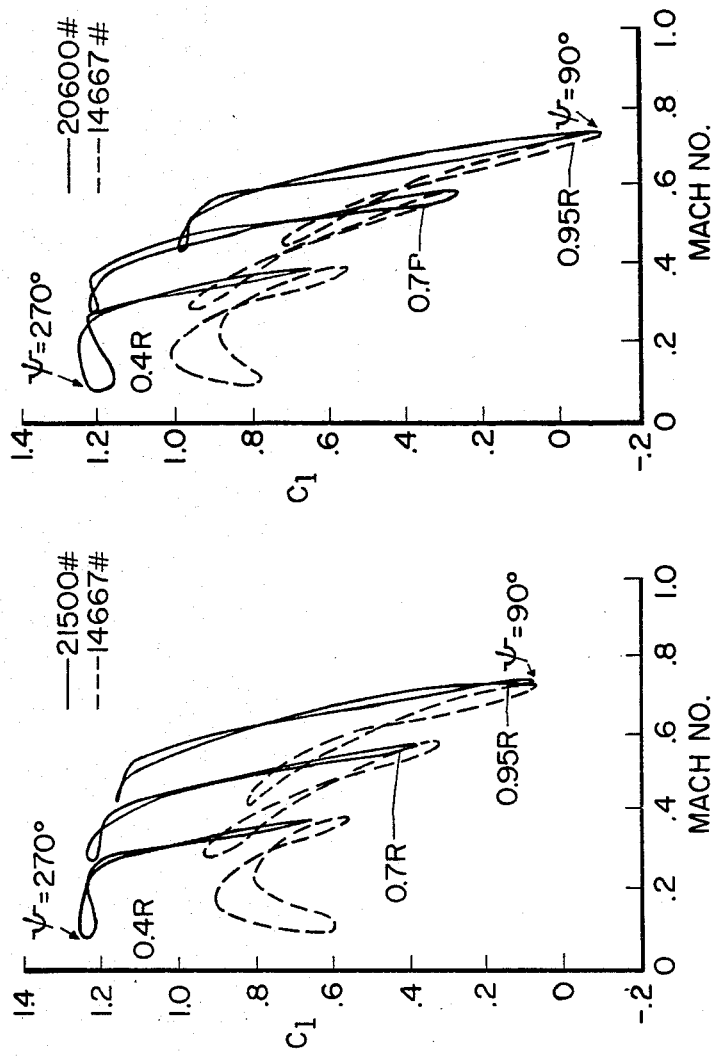
FIG. 1A is a plot of local lift coefficient against local Mach number for an airfoil section at three radial positions (0.40, 0.70, and 0.95 R) along a rotor blade of rectangular (baseline) planform; the loops observed are representative of those for a typical four bladed attack helicopter at 100 kts forward flight speed.
FIG 1B is a plot of local lift coefficient against local Mach number for an airfoil section at three radial positions (0.40, 0.70, and 0.95 R) along a rotor blade of tapered planform; the loops observed are representative of those for a typical four bladed attack helicopter at 100 kts forward flight speed.

Referring to FIGS. 1A and 1B, it is seen that the interaction of the helicopter rotor blade with the free stream is complex. It is apparent that the local lift coefficients $c_l$ and local Mach numbers experienced by the airfoil section at position 0.4R, which represents a distance from the rotor hub which is 40% of the total length of the rotor blade, are different from those experienced by the airfoil sections at positions 0.7R and 0.95R. It is also apparent that the local lift coefficient-Mach number relationships for the rectangular (baseline) planform of FIG. 1A at particular radial positions are different from those for the tapered planform of FIG. 1B at corresponding radial positions. Referring to FIG. 1A, the airfoil section at position 0.7R experiences local lift coefficients $c_l$ from about 0.3 at a Mach number of about 0.60 (when $\psi=90°$, i.e., advancing into the wind) to about 1.2 at a Mach number of about 0.30 ($\psi=270°$, i.e., retreating from the wind). Also the airfoil section at position 0.95R experiences lower local lift coefficients $c_l$ than those at position 0.7R at higher Mach numbers when advancing into the wind (Mach number of about 0.75 when $\psi=90°$) and retreating from the wind (Mach number of about 0.42 when $\psi=270°$). It is also apparent from FIGS. 1A and 1B that an increase in aircraft gross weight requires an increase in the local lift coefficients $c_l$ experienced by each airfoil section along the blade radius. It can also be inferred from FIGS. 1A and 1B that the limit to increases in gross weight will be reached when the local lift coefficient $c_l$ required exceeds the local maximum lift coefficient $c_{l_{max}}$ of that particular airfoil section for a substantial part of the blade radius. When the local maximum lift coefficient $c_{l_{max}}$ is exceeded, large increases in airfoil section drag (and sometimes pitching moment) occur, thereby necessitating more power to sustain the same flight conditions. Also, exceeding the local maximum lift coefficient $c_{l_{max}}$ may result in more blade twisting thereby reducing some flight conditions.

Figure 2:
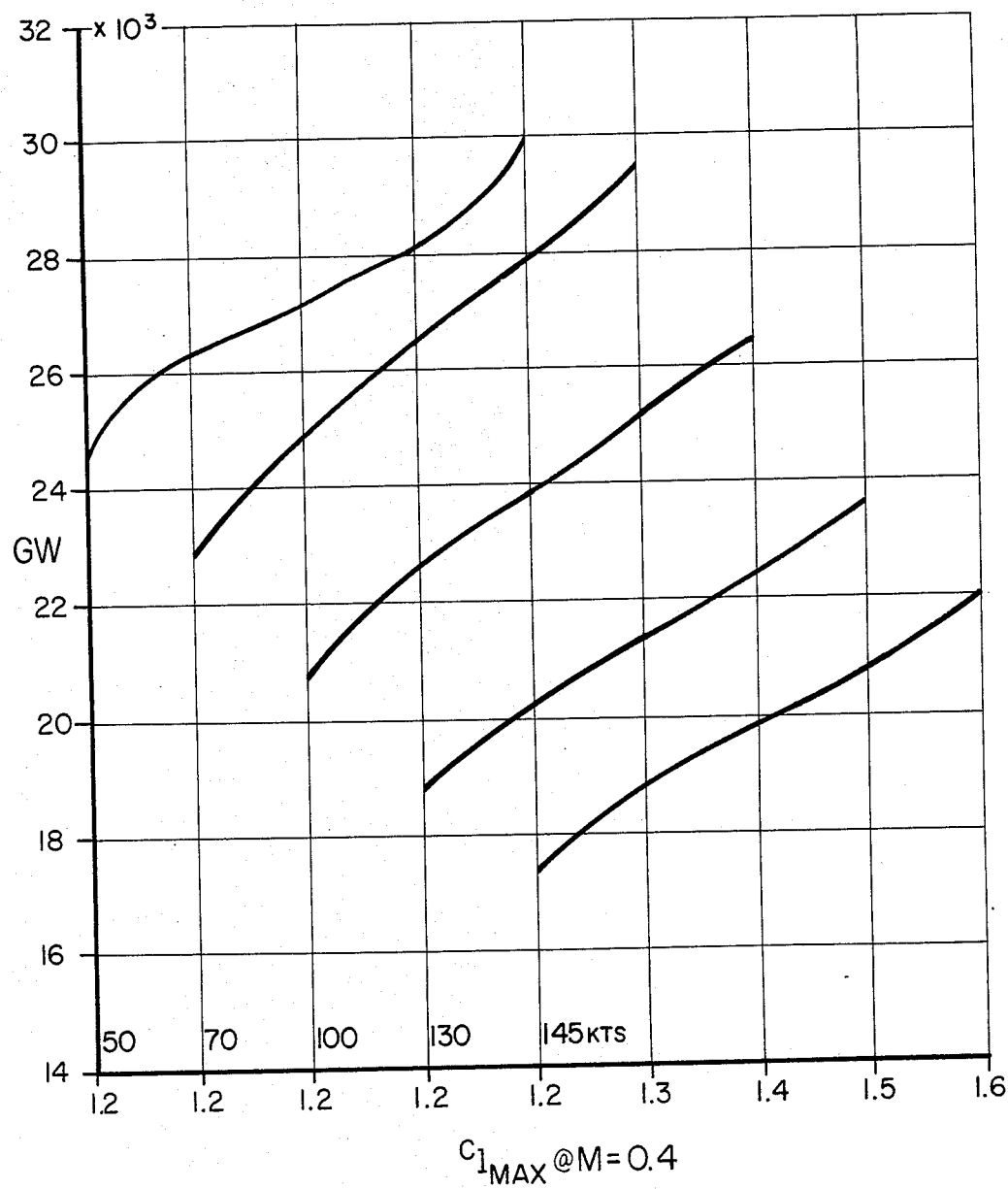
FIG. 2 is a plot of gross weight against the maximum airfoil section lift coefficient (M=0.40) for a representative four bladed attack helicopter.

FIG. 2 shows this direct relationship between the aircraft gross weight and the airfoil section maximum lift coefficient. It is apparent that increases in airfoil section $c_{l_{max}}$ allow increases in aircraft gross weight at each forward flight speed of 50, 70, 100, 130, and 145 kts, respectively.

Therefore, an inboard airfoil section (or sections) (R≦70%) is desired which has high maximum lift coefficients $c_{l_{max}}$'s over a range of Mach numbers (M≦0.40 for FIG. 1). It is also desirable to have low pitching moments over a broad range of lift coefficients $c_l$ and Mach numbers to minimize twisting of the rotor blade and to have a high drag divergence Mach number $M_{dd}$ for lift coefficients $c_l$ between about 0.2 to 0.4 ($M_{dd}≧0.60$ for FIG. 1) to minimize aircraft power requirements. Above the drag divergence Mach number $M_{dd}$, drag increases rapidly with increasing Mach number (see FIG. 13).

Figure 3:
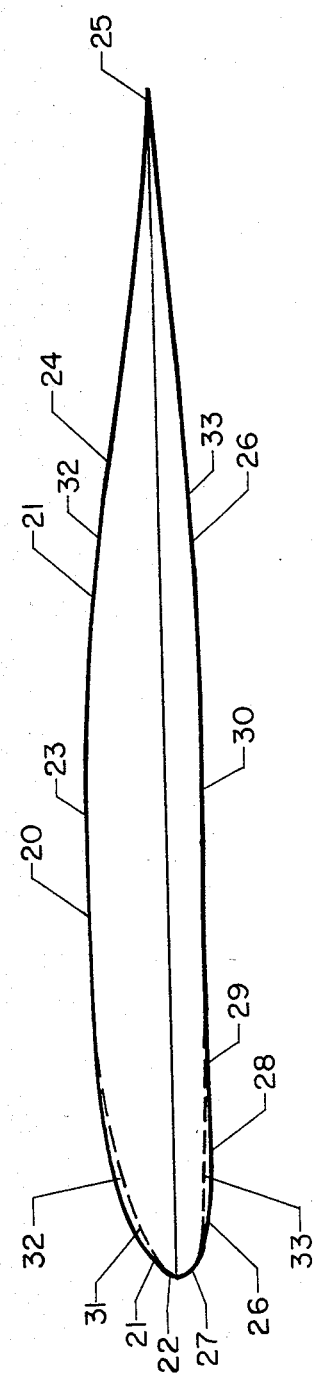
FIG. 3 is a plot of the profiles of two invention members of the two airfoil families according to the present invention.

Referring now to FIG. 3, the airfoil sections RC(4)-10 20 and RC(5)-10 31 having the desired characteristics are shown. These two members of the invention airfoil families are described more specifically by the coordinates given in Tables I and II. The airfoil section RC(4)-10 20 has an upper surface 21 which is associated with a leading edge 22. From the point or position 22 at which the leading edge 22 fairs into the upper surface 21, the slope of upper surface 21 is positive and decreasing to the maximum ordinate 23 at about thirty-seven percent chord location. Behind the maximum ordinate 23, the slope of upper surface 21 is negative and decreasing to inflection point 24 at about seventy percent chord location. Behind this inflection point 24, the slope of upper surface 21 continues to be negative but is increasing to trailing edge 25.

The lower surface 26 of airfoil section RC(4)-10 20 is associated with a leading edge 27. From the point or position 27 at which leading edge 27 fairs into the lower surface 26, the slope of lower surface 26 is negative and increasing to a local minimum 28 at about nine percent chord location. Behind this local minimum 28, the slope of lower surface 26 is positive and increasing to a local maximum 29 at about nineteen percent chord location. Behind this local maximum 29, the slope of lower surface 26 is negative and decreasing to the minimum ordinate 30 at about forty-two percent chord location. Behind the minimum ordinate 30, the slope of lower surface 26 is positive and increasing to trailing edge 25.

Figure 9:
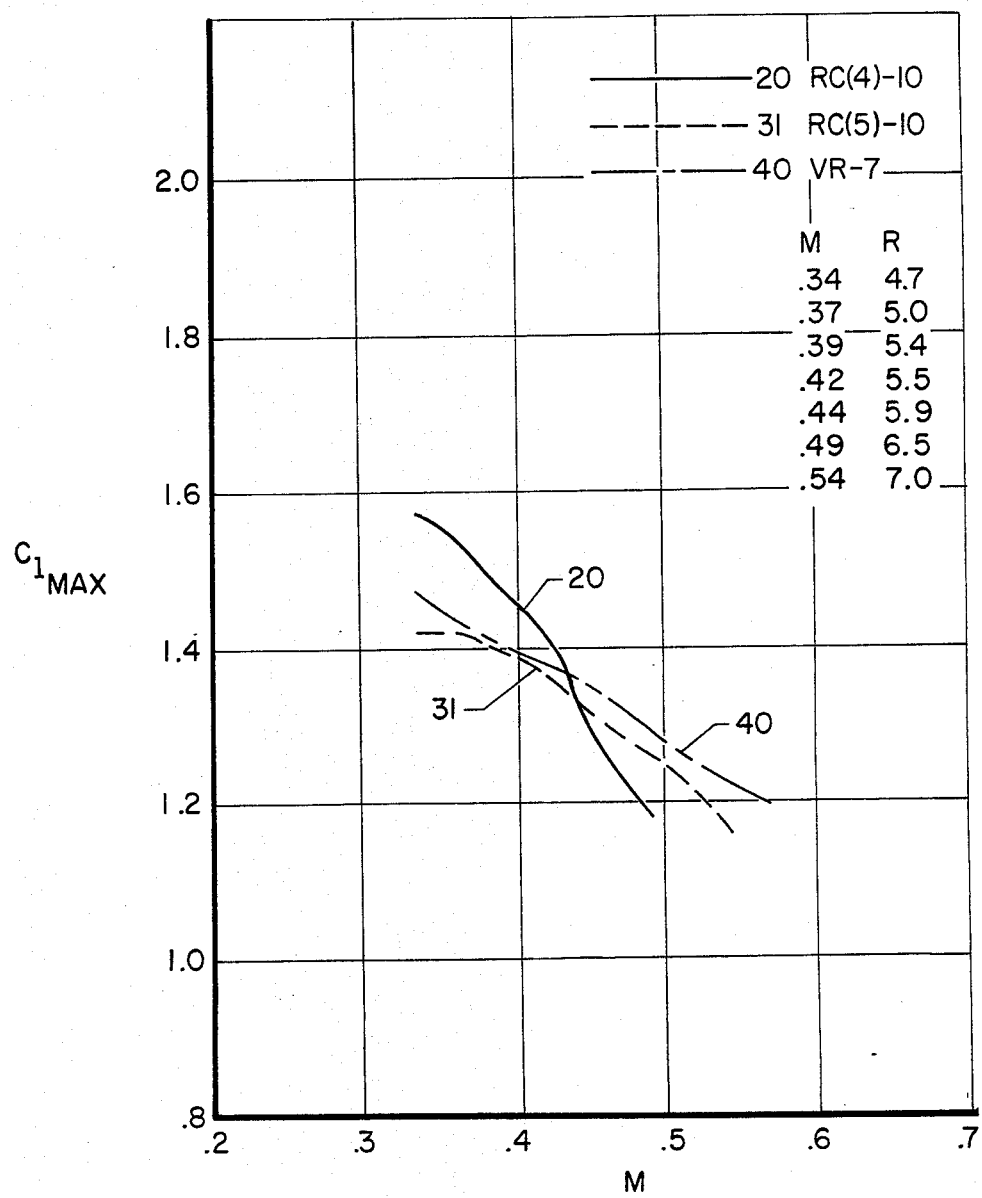
FIG. 9 is a plot of maximum lift coefficient against Mach number for two 10-percent thick members of the two airfoil families according to the present invention and a prior art airfoil section.
Figure 12:
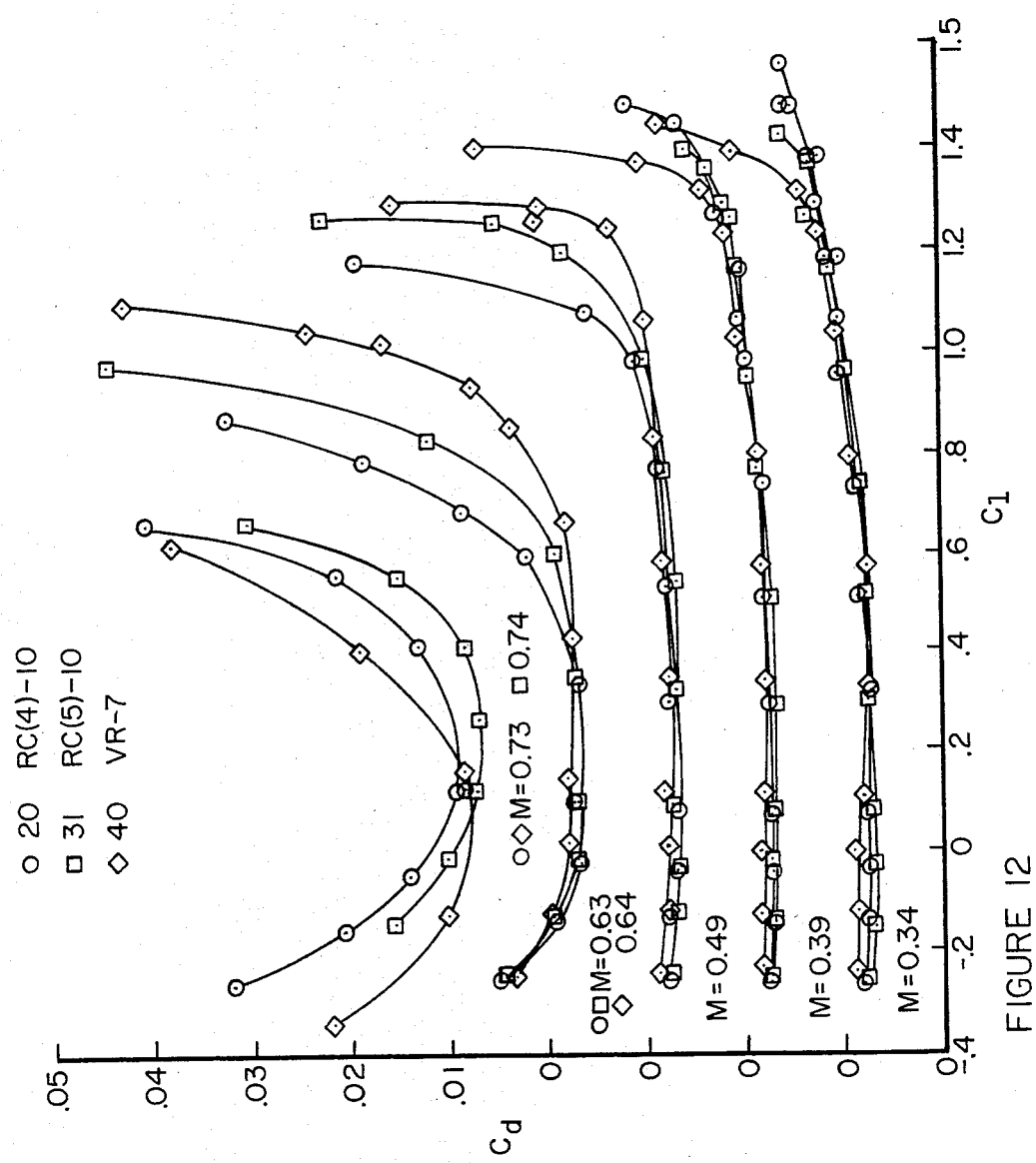
FIG. 12 is a plot of the drag coefficient against lift coefficient for a member of each of the two airfoil families according to the present invention and a prior art airfoil section.
Figure 13:
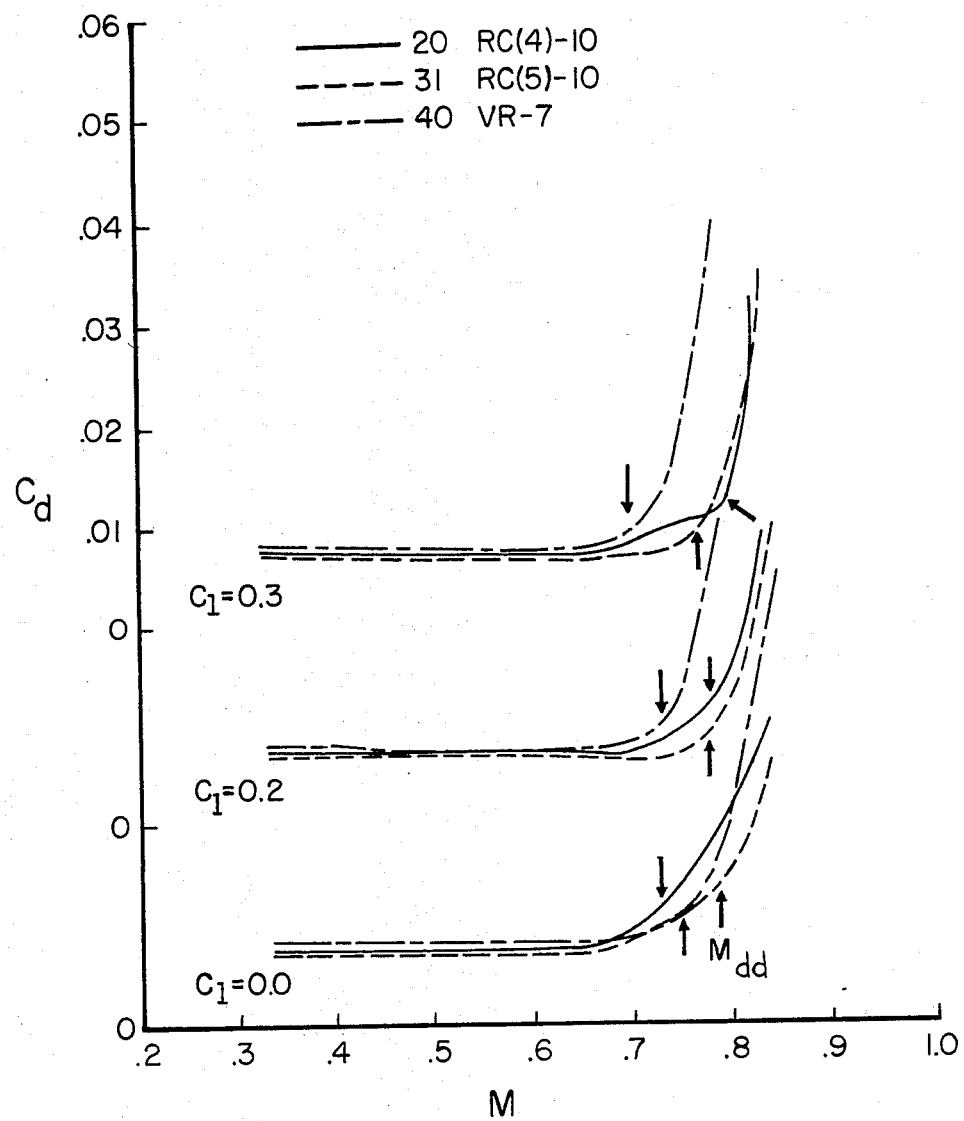
FIG. 13 is a plot the drag coefficient against Mach number for a member of each of the two airfoil families according to the present invention and a prior art airfoil section.

Still referring to FIG. 3, the shape of airfoil section RC(5)-10 31 is seen to be very similar to that of airfoil section RC(4)-10 20. However, the small differences in shape apparent in FIG. 3 result in substantial differences in airfoil performance, as shown in FIGS. 9, 12, and 13. The main distinction between the RC(5)-10 31 and the RC(4)-10 20 is found in their respective lower surfaces. The slope of the lower surface 33 of airfoil section RC(5)-10 31 is negative and increasing from leading edge 27 to the minimum ordinate 30 at about forty-two percent chord location, experiencing neither the local minimum 28 or the local maximum 29 of lower surface 26 of airfoil section RC(4)-10 20. Behind the minimum ordinate 30, the slope of lower surface 33 is positive and increasing to trailing edge 25, as is the slope of lower surface 26. Another distinction is found in the upper surfaces of the two airfoil sections. The ordinates of upper surface 32 of airfoil section RC(5)-10 31 are less positive than the ordinates of upper surface 21 of RC(4)-10 20 from about the leading edge to about twenty two percent chord location. Behind about twenty two percent chord location, the slope of upper surface 32 is identical to that of upper surface 21.

Figure 4:
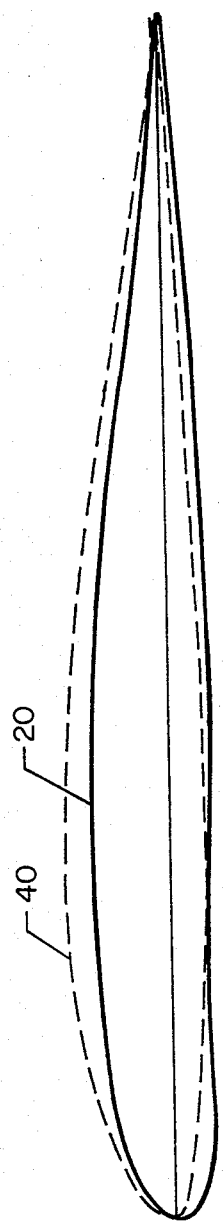
FIG. 4 is a plot of the profile of the invention airfoil RC(4)-10 superimposed on the profile of a prior art airfoil design.

FIG. 4 compares the RC(4)-10 20 with the VR-7 40, an airfoil section well known in the art, which Boeing Vertol designed for inboard applications in rotor blades. Disregarding the difference in maximum thickness (12% for VR-7 40 and 10% for RC(4)-10 20), it is obvious that the two airfoils have significant differences in shape.

Figure 5:
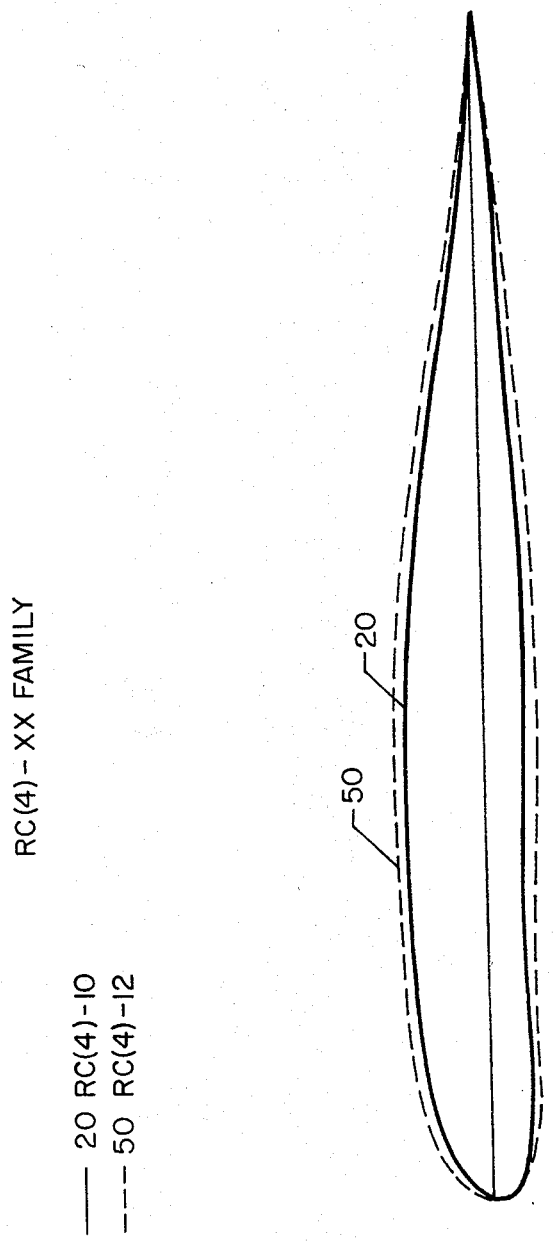
FIG. 5 is a plot of the profiles for two representative members of the invention airfoil family RC(4)-XX.

FIG. 5 shows two representative members of the RC(4)-XX family. The two members differ from each other only by the amount of thickness i.e., the RC(4)-12 50 thickness distribution is scaled from the RC(4)-10 20 thickness distribution and both members have a common camber line. The 12 percent thick airfoil, RC(4)-12 50, would be expected to have higher maximum lift coefficients but lower drag divergence Mach numbers than the 10 percent thick airfoil, RC(4)-10 20; the pitching moment coefficients would be about the same for both. Depending on the application, either one of these members could be utilized as the inboard section of a rotor blade or propeller or both could be utilized in conjuncton with each other as the inboard sections.

Figure 6:
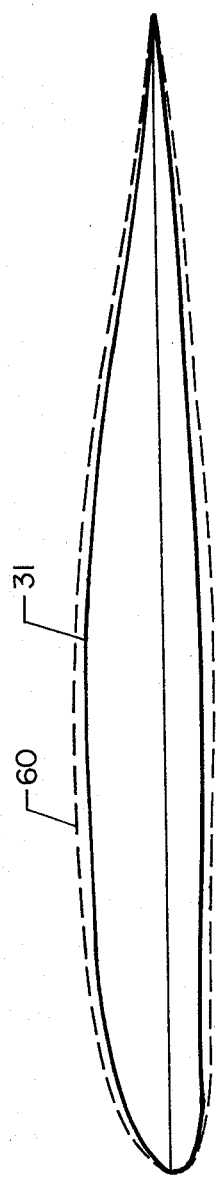
FIG. 6 is a plot of the profiles of two representative members of the invention airfoi family RC(5)-XX.

FIG. 6 shows two representative members of the RC(5)-XX family. The RC(5)-10 31 airfoil, shown as the solid line, differs from the RC(5)-12 60, shown as the dashed line, only by the amount of thickness. The RC(5)-10 31 is ten percent thick and the RC(5)-12 60 is 12 percent thick. Depending on the application, either one of these airfoils could be utilized as the inboard section of a rotor blade or both could be utilized together as the inboard sections. Again depending on the application, one of the airfoils in FIG. 6 could be used in conjunction with one of the airfoils shown in FIG. 5 as the inboard sections of a rotor blade or propeller.

FIG. 7 is a plot of the thickness distribution of the RC(4)-10 20, RC(4)-12 50, and RC(5)-10 31 airfoils. The thickness-to-chord ratios, t/c, is plotted against the non-dimensional distance from the leading edge of the airfoil measured along the chordline of the airfoil, $\chi/c$. It is obvious that the thickness distribution of the RC(5)-10 31 airfoil is lower than that of the RC(4)-10 20 from near the leading edge to near the point of maximum thickness. This small difference in thickness distribution results in large differences in maximum lift coefficient and drag divergence Mach number. The values which define the thickness distributions of the RC(4)-10 20 and RC(4)-12 50 at a given $\chi/c$ are proportional to each other or scaled from each other. The specific values of t/c of the RC(4)-12 50 airfoil are 120 percent of the t/c values of the RC(4)-10 20 airfoil because the maximum thickness of the RC(4)-12 50 airfoil is 12 percent and the maximum thickness of the RC(4)-10 20 airfoil is 10 percent. Other thickness distributions can be formed in a similar manner to define other curves which are members of the invention airfoil families.

FIG. 8 is a plot of the camber distribution of the invention airfoils. The non-dimensional ordinate of the camber line z/c is plotted against the non-dimensional distance from the leading edge of the airfoil measured along the chord line of the airfoil $\chi/c$. All members of the invention airfoil families have this common camber distribution.

When any one of the scaled thickness distributions relating to FIG. 7 is combined with the camber line shown in FIG. 8, an additional airfoil profile is defined which comes within the scope of the invention. The combination is the usual one known to those skilled in the art which is the laying off of a line segment of length t/c perpendicular to the camber line and intersecting the camber line at the midpoint of the line segment. FIGS. 7 and 8 are thus further representative of the shapes of the members of the two invention airfoil families.

OPERATION OF THE INVENTION

From the above description of the structural arrangement of the airfoil sections, the operation of the invention should now become apparent. The airfoil sections are designed to operate at higher lift coefficients before stalling (higher $c_{1max}$) at Mach numbers up to 0.50, to operate with near zero pitching moment coefficient for lift coefficients from $-0.2$ to 1.0 for Mach numbers up to 0.63, and to operate with drag divergence Mach numbers in excess of 0.70 for lift coefficients from 0.0 to 0.30.

Figure 10:
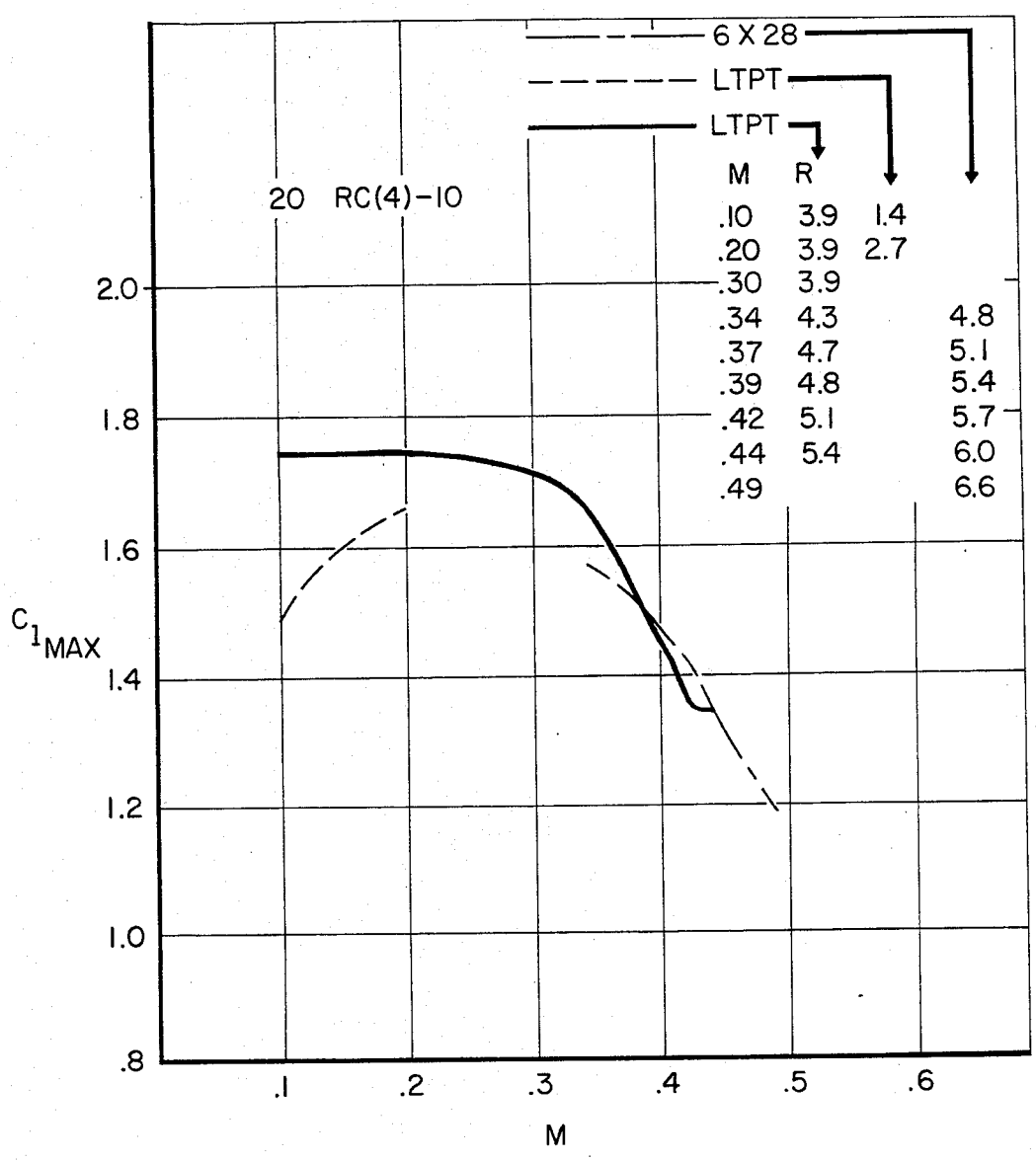
FIG. 10 is a plot of the maximum lift coefficient against Mach number for a 10 percent thick member of the invention airfoil family RC(4)-XX.
Figure 11:
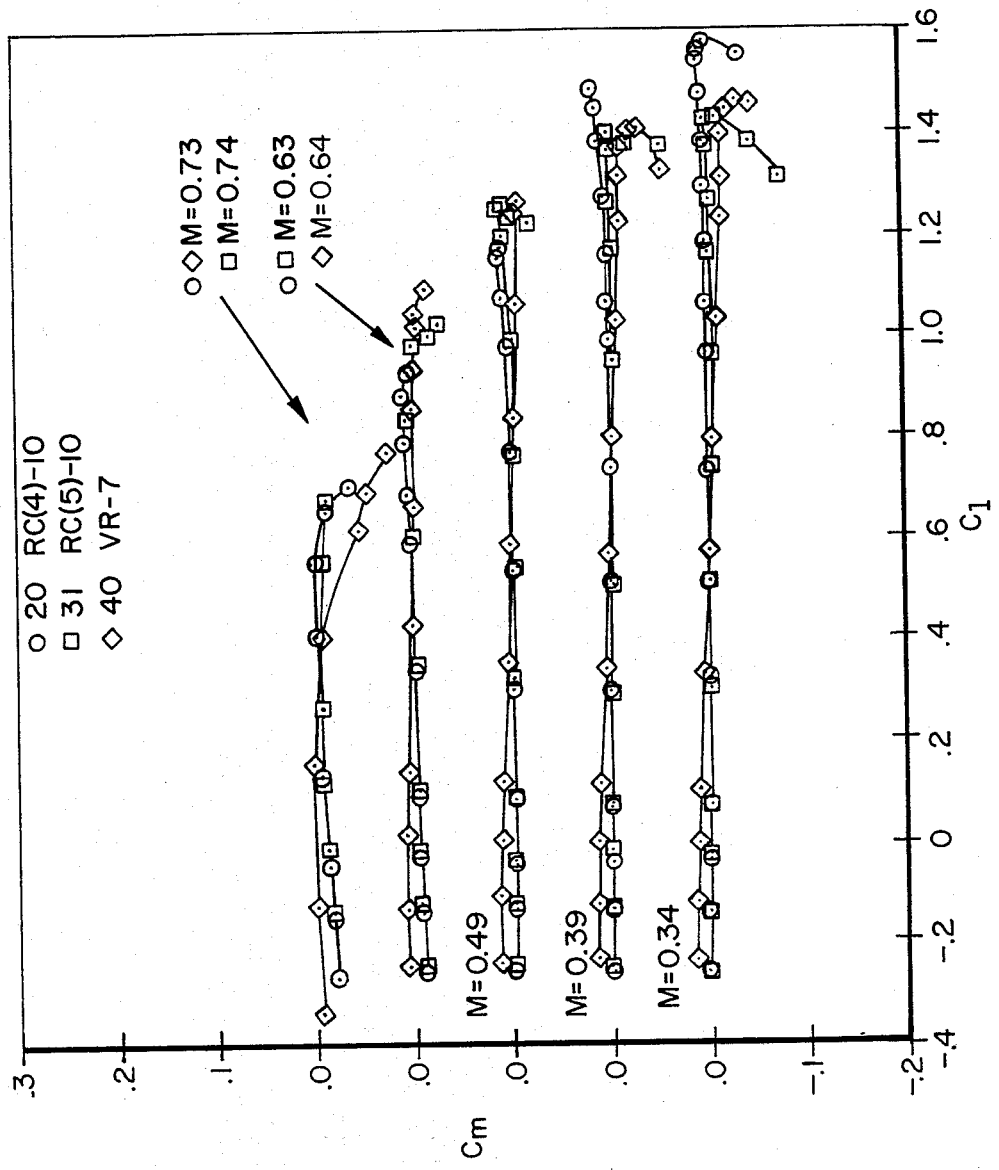
FIG. 11 is a plot of the pitching moment coefficient about the quarter chord against lift coefficient for a member of each of the two airfoil families according to the present invention and a prior art airfoil section.

FIG. 9 shows the maximum lift coefficients as determined from wind tunnel measurements for two 10-percent-thick members of the invention airfoil families and for a prior art airfoil section. It is apparent that the RC(4)-10 20 airfoil has higher maximum lift coefficients than the prior art airfoil for Mach numbers up to about 0.43. If the maximum thickness of the RC(5)-10 31 airfoil is increased to 12 percent (same as VR-7 40), the maximum lift coefficients of this airfoil at all Mach numbers presented can reasonably be expected to be higher than those for the prior art airfoil, VR-7 40. FIG. 10 shows the maximum lift coefficients of the RC(4)-10 20 airfoil measured in two different wind tunnels and at different Reynolds numbers. It is important to note that comparisons of $c_{1max}$ data of different airfoils should be done only for test Reynolds numbers which are nearly the same. FIG. 11 shows the pitching moment coefficients about the quarter chord (experimental data) for the same two members of the invention airfoil families and the same prior art airfoil section. It is apparent that the pitching moment coefficients of the two invention airfoils are generally closer to zero than those of the prior art airfoil for Mach numbers up to 0.63. FIG. 12 shows the drag coefficients of the RC(4)-10 20, RC(5)-10 31, and VR-7 40 airfoils. The prior art airfoil section VR-7 40 has lower drag coefficients at the higher lift coefficients at Mach numbers of 0.49 and 0.64, but it is likely that a good rotor design would not require the rotor to be operating at those conditions. FIG. 13 shows the drag coefficient as a function of Mach number (experimental data) at lift coefficients of 0.0, 0.2, and 0.3 for the RC(4)-10 20, RC(5)-10 31, and VR-7 40 airfoils. It is apparent that both invention airfoils have higher drag divergence Mach numbers than the VR-7 40 airfoil at lift coefficients of 0.2 and 0.3 and that the RC(5)-10 31 airfoil has a higher drag divergence Mach number than the VR-7 40 at a lift coefficient of 0.0.

It is to be understood that the advantage of utilizing one or more members of the invention airfoil families is dependent on the particular rotor blade design and the particular helicopter on which the rotor blades are to be used. FIGS. 9 and 13 indicate that an increase in gross weight of about 800 lbs could be had for a typical four bladed attack helicopter at 100 kts by utilizing the RC(4)-10 20 airfoil in place of one with characteristics like the VR-7 40 airfoil.

It is to be understood that the forms of the invention shown are merely preferred embodiments and various changes can be made in the shape, size and the arrangement of the airfoil sections as will be readily apparent to those skilled in the art. Also, equivalent means may be substituted for those described and certain features may be used independently from other features described herein without departing from the spirit and scope of the invention.

TABLE I

Design Coordinates For RC(4)-10 Airfoil
(Stations and Ordinates Given in Percent Airfoil Chord)

| Stations | Upper Surface | Stations | Lower Surface |
|---|---|---|---|
| 00.0000 | −00.5726 | 00.0000 | −00.5726 |
| 00.2864 | 00.4313 | 00.4687 | −01.5907 |
| 00.9072 | 01.3175 | 01.4350 | −02.1823 |
| 02.3543 | 02.5980 | 01.6462 | −02.2703 |
| 04.7036 | 03.8875 | 02.5184 | −02.5664 |
| 07.3686 | 04.7953 | 03.5595 | −02.8199 |
| 10.0188 | 05.3673 | 06.1865 | −03.1576 |
| 12.6143 | 05.7324 | 08.4979 | −03.2337 |
| 15.1842 | 05.9790 | 10.8242 | −03.2011 |
| 17.7227 | 06.1579 | 13.2051 | −03.1269 |
| 20.2556 | 06.2995 | 15.6116 | −03.0611 |
| 22.7760 | 06.4163 | 18.0495 | −03.0276 |
| 25.2956 | 06.5143 | 20.4930 | −03.0257 |
| 30.3145 | 06.6614 | 22.9490 | −03.0430 |
| 35.3142 | 06.7381 | 25.4059 | −03.0703 |
| 37.8140 | 06.7422 | 30.3398 | −03.1393 |
| 40.3297 | 06.7163 | 35.2929 | −03.2090 |
| 42.8390 | 06.6543 | 37.7696 | −03.2369 |
| 45.3678 | 06.5499 | 40.2303 | −03.2553 |
| 47.8891 | 06.4013 | 42.6974 | −03.2600 |
| 50.3763 | 06.2129 | 45.1451 | −03.2474 |
| 52.8707 | 05.9876 | 47.6002 | −03.2163 |
| 55.3618 | 05.7324 | 50.0894 | −03.1659 |
| 57.8512 | 05.4510 | 52.5714 | −03.0972 |
| 60.3417 | 05.1447 | 55.0567 | −03.0090 |
| 62.8341 | 04.8144 | 57.5437 | −02.9062 |
| 65.3244 | 04.4621 | 60.0297 | −02.7933 |
| 67.8157 | 04.0912 | 62.5136 | −02.6750 |
| 70.2978 | 03.7093 | 64.9997 | −02.5542 |
| 72.7694 | 03.3251 | 67.4849 | −02.4327 |
| 75.2502 | 02.9451 | 69.9792 | −02.3108 |
| 77.7197 | 02.5808 | 72.4840 | −02.1873 |
| 80.1713 | 02.2378 | 74.9797 | −02.0610 |
| 82.6309 | 01.9139 | 77.4866 | −01.9273 |
| 85.0970 | 01.6086 | 80.0114 | −01.7818 |
| 87.5699 | 01.3211 | 82.5282 | −01.6215 |
| 90.0509 | 01.0514 | 85.0386 | −01.4420 |
| 92.5350 | 00.8012 | 87.5421 | −01.2443 |

TABLE I-continued

Design Coordinates For RC(4)-10 Airfoil
(Stations and Ordinates Given in Percent Airfoil Chord)

| Stations | Upper Surface | Stations | Lower Surface |
|---|---|---|---|
| 95.0185 | 00.5722 | 90.0374 | −01.0312 |
| 97.5028 | 00.3652 | 92.5298 | −00.8079 |
| 100.0000 | 00.1785 | 95.0227 | −00.5728 |
|  |  | 97.5148 | −00.3160 |
|  |  | 100.0000 | 00.0203 |

TABLE II

Design Coordinates For RC(5)-10 Airfoil
(Stations and Ordinates Given in Percent Airfoil Chord)

| Stations | Upper Surface | Stations | Lower Surface |
|---|---|---|---|
| 00.0000 | −00.6628 | 00.0000 | −00.6628 |
| 00.2804 | 00.2043 | 00.3495 | −01.4193 |
| 00.9229 | 01.0156 | 01.1972 | −01.8937 |
| 02.3372 | 02.1475 | 01.4150 | −01.9692 |
| 04.7014 | 03.3786 | 02.2672 | −02.1937 |
| 07.3268 | 04.2886 | 03.3442 | −02.3815 |
| 09.9519 | 04.9191 | 05.9623 | −02.6178 |
| 12.5345 | 05.3634 | 08.3193 | −02.6954 |
| 15.0964 | 05.6898 | 10.6766 | −02.7174 |
| 17.6322 | 05.9389 | 13.0763 | −02.7247 |
| 20.1645 | 06.1379 | 15.4968 | −02.7431 |
| 22.6856 | 06.3002 | 17.9434 | −02.7824 |
| 25.2069 | 06.4343 | 20.3935 | −02.8381 |
| 30.2312 | 06.6315 | 22.8548 | −02.9009 |
| 35.2368 | 06.7354 | 25.3158 | −02.9641 |
| 37.7395 | 06.7464 | 30.2563 | −03.0826 |
| 40.2583 | 06.7237 | 35.2155 | −03.1788 |
| 42.7706 | 06.6621 | 37.6951 | −03.2134 |
| 45.3024 | 06.5566 | 40.1588 | −03.2354 |
| 47.8267 | 06.4067 | 42.6288 | −03.2420 |
| 50.3169 | 06.2175 | 45.0794 | −03.2303 |
| 52.8143 | 05.9920 | 47.5374 | −03.1997 |
| 55.3083 | 05.7368 | 50.0296 | −03.1465 |
| 57.8007 | 05.4553 | 52.5146 | −03.0745 |
| 60.2942 | 05.1488 | 55.0029 | −02.9863 |
| 62.7896 | 04.8180 | 57.4929 | −02.8855 |
| 65.2829 | 04.4654 | 59.9818 | −02.7753 |
| 67.7772 | 04.0942 | 62.4687 | −02.6595 |
| 70.2623 | 03.7121 | 64.9578 | −02.5403 |
| 72.7368 | 03.3279 | 67.4460 | −02.4202 |
| 75.2205 | 02.9477 | 69.9432 | −02.2995 |
| 77.6930 | 02.5829 | 72.4511 | −02.1778 |
| 80.1476 | 02.2394 | 74.9497 | −02.0542 |
| 82.6101 | 01.9150 | 77.4597 | −01.9242 |
| 85.0791 | 01.6094 | 79.9875 | −01.7832 |
| 87.5550 | 01.3218 | 82.5073 | −01.6277 |
| 90.0390 | 01.0519 | 85.0207 | −01.4525 |
| 92.5260 | 00.8016 | 87.5272 | −01.2545 |
| 95.0125 | 00.5726 | 90.0255 | −01.0315 |
| 97.4998 | 00.3655 | 92.5209 | −00.8026 |
| 100.0000 | 00.1787 | 95.0168 | −00.5703 |
|  |  | 97.5118 | −00.3169 |
|  |  | 100.0000 | 00.0204 |

What is claimed as new and desired to be secured by Letters Patent of the United States is:

1. An airfoil for a rotating blade such as a helicopter blade or airplane propeller which provides for operation at higher lift coefficients than previous airfoils before stalling at Mach numbers from near zero to about 0.50 and which simultaneously provides both near zero pitching moments about the quarter chord and low drag coefficients for a broad range of lift coefficients and Mach numbers, comprising:

an airfoil means having an upper surface means, a lower surface means, an upper surface leading edge area, a lower surface leading edge area, and a trailing edge;

said upper surface means having a surface slope which is positive and decreasing from the position where it fairs into said upper surface leading edge area to a position at approximately 37% chord, a surface slope which is negative and decreasing from approximately 37% chord to approximately 70% chord, and a surface slope which is negative and increasing from approximately 70% chord to said trailing edge:

said lower surface means having a surface slope which is negative and increasing from the position where it fairs into said lower surface leading edge area to a position at approximately 9% chord, a surface slope which is positive and increasing from approximately 9% chord to approximately 19% chord, a surface slope which is negative and decreasing from approximately 19% chord to approximately 42% chord, and a surface slope which is positive and increasing from approximately 42% chord to said trailing edge.

* * * * *